United States Patent
Karabinis

(10) Patent No.: US 9,806,790 B2
(45) Date of Patent: Oct. 31, 2017

(54) SYSTEMS/METHODS OF SPECTRALLY EFFICIENT COMMUNICATIONS

(71) Applicant: Odyssey Wireless, Inc., Cary, NC (US)

(72) Inventor: Peter D. Karabinis, Cary, NC (US)

(73) Assignee: Odyssey Wireless, Inc., Cary, NC (US)

( * ) Notice: Subject to any disclaimer, the term of this patent is extended or adjusted under 35 U.S.C. 154(b) by 557 days.

(21) Appl. No.: 14/455,069

(22) Filed: Aug. 8, 2014

(65) Prior Publication Data

US 2014/0348114 A1 Nov. 27, 2014

Related U.S. Application Data

(63) Continuation-in-part of application No. 13/767,537, filed on Feb. 14, 2013, now Pat. No. 8,891,645, which
(Continued)

(51) Int. Cl.
*H04B 7/12* (2006.01)
*H04L 5/00* (2006.01)
(Continued)

(52) U.S. Cl.
CPC ............... *H04B 7/12* (2013.01); *H04L 5/001* (2013.01); *H04L 5/0007* (2013.01);
(Continued)

(58) Field of Classification Search
CPC ......... H04B 7/12; H04L 5/001; H04L 5/0007; H04L 25/03343; H04L 27/2628; H04L 27/2633; H04L 27/2647; H04L 27/265
See application file for complete search history.

(56) References Cited

U.S. PATENT DOCUMENTS

| 4,085,368 A | 4/1978 | Yeh |
| 4,635,276 A | 1/1987 | Karabinis |

(Continued)

FOREIGN PATENT DOCUMENTS

| EP | 0 869 647 A2 | 10/1998 |
| EP | 1 328 071 A1 | 7/2003 |

(Continued)

OTHER PUBLICATIONS

Commonly assigned, co-pending U.S. continuation-in-part U.S. Appl. No. 13/745,729 titled "Methods, Systems, and Non-Transitory Computer Readable Media for Wideband Frequency and Bandwidth Tunable Filtering", (unpublished, filed Jan. 18, 2013).

(Continued)

*Primary Examiner* — Edan Orgad
*Assistant Examiner* — Jeremy Costin
(74) *Attorney, Agent, or Firm* — Coats & Bennett, PLLC

(57) ABSTRACT

First and second receivers are used to receive respective first and second signals, to process said first and second signals and provide respective first and second measures thereof to respective first and second transmitters. The first and second transmitters are configured to launch the first and second measures, respectively, each comprising a desired component that has originated at a desired source, and an interference component that has originated at an interfering source. The first and/or second transmitters are configured to process and launch the respective first and second measures, properly conditioned, so that upon interception thereof by a receiving element the interference components thereof add destructively and substantially cancel (or at least partially cancel) each other, whereas the desired components avoid substantial cancellation owing to a phase relationship therebetween that differs relative to a phase relationship between the interference components.

11 Claims, 3 Drawing Sheets

BASE STATION CONFIGURATION

Related U.S. Application Data is a continuation of application No. 13/528,058, filed on Jun. 20, 2012, now Pat. No. 8,537,916, which is a continuation of application No. 12/748,931, filed on Mar. 29, 2010, now Pat. No. 8,233,554.

(60) Provisional application No. 61/868,151, filed on Aug. 21, 2013.

(51) Int. Cl.
  *H04L 25/03* (2006.01)
  *H04L 27/26* (2006.01)
  *H04L 25/02* (2006.01)

(52) U.S. Cl.
  CPC ...... *H04L 25/03343* (2013.01); *H04L 27/265* (2013.01); *H04L 27/2628* (2013.01); *H04L 27/2633* (2013.01); *H04L 27/2647* (2013.01); *H04L 5/006* (2013.01); *H04L 25/0204* (2013.01); *H04L 25/0224* (2013.01); *H04L 25/03006* (2013.01); *H04L 2025/03414* (2013.01)

(56) References Cited

U.S. PATENT DOCUMENTS

| | | |
|---|---|---|
| 5,029,184 A | 7/1991 | Andren et al. |
| 5,117,401 A | 5/1992 | Feintuch |
| 5,179,727 A | 1/1993 | Imagawa |
| 5,252,930 A | 10/1993 | Blauvelt |
| 5,394,433 A | 2/1995 | Bantz et al. |
| 5,412,735 A | 5/1995 | Engebretson et al. |
| 5,559,828 A | 9/1996 | Armstrong et al. |
| 5,712,641 A | 1/1998 | Casabona et al. |
| 5,736,909 A | 4/1998 | Hauser et al. |
| 5,778,029 A | 7/1998 | Kaufmann |
| 5,848,160 A | 12/1998 | Cai et al. |
| 5,872,540 A | 2/1999 | Casabona et al. |
| 5,966,312 A | 10/1999 | Chen |
| 6,140,935 A | 10/2000 | Hayton et al. |
| 6,141,567 A | 10/2000 | Youssefmir et al. |
| 6,198,730 B1 | 3/2001 | Hogberg et al. |
| 6,243,370 B1 | 6/2001 | Schilling |
| 6,295,461 B1 | 9/2001 | Palmer et al. |
| 6,323,806 B1 | 11/2001 | Greving |
| 6,359,503 B1 | 3/2002 | Alini et al. |
| 6,389,002 B1 | 5/2002 | Schilling |
| 6,407,989 B2 | 6/2002 | Schilling |
| 6,433,720 B1 | 8/2002 | Libove et al. |
| 6,466,629 B1 | 10/2002 | Isaksson et al. |
| 6,473,449 B1 | 10/2002 | Cafarella et al. |
| 6,484,260 B1 | 11/2002 | Scott et al. |
| 6,639,541 B1 | 10/2003 | Quintana et al. |
| 6,661,847 B1 | 12/2003 | Davis et al. |
| 6,710,739 B1 | 3/2004 | Loegering |
| 6,711,145 B2 | 3/2004 | Schilling |
| 6,765,895 B1 | 7/2004 | Watanabe |
| 6,765,969 B1 | 7/2004 | Vook et al. |
| 6,799,141 B1 | 9/2004 | Stoustrup et al. |
| 6,922,570 B2 | 7/2005 | Awater et al. |
| 6,965,992 B1 | 11/2005 | Joseph et al. |
| 7,017,047 B2 | 3/2006 | Vanska et al. |
| 7,020,125 B2 | 3/2006 | Schilling |
| 7,020,165 B2 | 3/2006 | Rakib et al. |
| 7,113,601 B2 | 9/2006 | Ananda |
| 7,145,933 B1 | 12/2006 | Szajnowski |
| 7,155,340 B2 | 12/2006 | Churan |
| 7,203,490 B2 | 4/2007 | Karabinis et al. |
| 7,218,693 B2 | 5/2007 | Troulis |
| 7,289,972 B2 | 10/2007 | Rieser et al. |
| 7,292,627 B2 | 11/2007 | Tzannes |
| 7,295,637 B2 | 11/2007 | Papathanasiou et al. |
| 7,333,422 B2 | 2/2008 | Amer |
| 7,362,695 B2 | 4/2008 | Akahori |
| 7,362,829 B2 | 4/2008 | Ojard |
| 7,418,053 B2 | 8/2008 | Perlman et al. |
| 7,444,170 B2 | 10/2008 | Karabinis |
| 7,454,175 B2 | 11/2008 | Karabinis |
| 7,483,672 B2 | 1/2009 | Hart et al. |
| 7,505,522 B1 | 3/2009 | Larsson |
| 7,561,212 B2 | 7/2009 | Nakamura |
| 7,613,242 B2 | 11/2009 | Bykovnikov |
| 7,616,704 B2 | 11/2009 | Li et al. |
| 7,668,253 B2 | 2/2010 | Hwang et al. |
| 7,733,940 B2 | 6/2010 | Dooley et al. |
| 7,738,571 B2 | 6/2010 | Costa et al. |
| 7,756,002 B2 | 7/2010 | Batra et al. |
| 7,830,995 B2 | 11/2010 | Ojard |
| 7,876,845 B2 | 1/2011 | Karabinis |
| 7,904,047 B2 | 3/2011 | Darabi |
| 7,949,032 B1 | 5/2011 | Frost |
| 7,970,345 B2 | 6/2011 | Cummiskey et al. |
| 7,974,176 B2 | 7/2011 | Zheng |
| 8,032,103 B2 | 10/2011 | Lackey |
| 8,050,337 B2 | 11/2011 | Karabinis |
| 8,064,837 B2 | 11/2011 | Sampath |
| 8,086,206 B1 | 12/2011 | Lackey |
| 8,090,338 B1 | 1/2012 | Lackey |
| 8,090,339 B1 | 1/2012 | Lackey |
| 8,185,931 B1 | 5/2012 | Reeves |
| 8,233,554 B2 | 7/2012 | Karabinis |
| 8,666,347 B2 | 3/2014 | Wilkerson et al. |
| 2001/0048538 A1 | 12/2001 | Kowalski |
| 2001/0050926 A1 | 12/2001 | Kumar |
| 2002/0065099 A1 | 5/2002 | Bjorndahl |
| 2002/0122499 A1 | 9/2002 | Kannan et al. |
| 2002/0150109 A1 | 10/2002 | Agee |
| 2002/0159533 A1 | 10/2002 | Crawford |
| 2002/0193115 A1 | 12/2002 | Furukawa et al. |
| 2002/0196765 A1 | 12/2002 | Tulino |
| 2002/0197958 A1* | 12/2002 | Collins ............... H03G 3/344 455/42 |
| 2003/0107513 A1 | 6/2003 | Abraham et al. |
| 2003/0130751 A1 | 7/2003 | Lim |
| 2003/0161385 A1 | 8/2003 | Chang et al. |
| 2003/0228017 A1 | 12/2003 | Beadle et al. |
| 2004/0005013 A1 | 1/2004 | Nunally et al. |
| 2004/0039524 A1 | 2/2004 | Adachi |
| 2004/0080315 A1 | 4/2004 | Beevor et al. |
| 2004/0086027 A1 | 5/2004 | Shattil |
| 2004/0093224 A1 | 5/2004 | Vanska et al. |
| 2004/0095907 A1 | 5/2004 | Agee et al. |
| 2004/0132417 A1 | 7/2004 | Maeda et al. |
| 2004/0151109 A1 | 8/2004 | Batra et al. |
| 2004/0170430 A1 | 9/2004 | Gorokhov |
| 2004/0252853 A1 | 12/2004 | Blamey et al. |
| 2005/0013238 A1 | 1/2005 | Hansen |
| 2005/0128938 A1 | 6/2005 | Fang et al. |
| 2005/0207385 A1 | 9/2005 | Gorokhov et al. |
| 2005/0208944 A1 | 9/2005 | Okita et al. |
| 2005/0243938 A1 | 11/2005 | Armstrong et al. |
| 2005/0255878 A1 | 11/2005 | Leinonen et al. |
| 2005/0281321 A1 | 12/2005 | Bergstrom et al. |
| 2006/0009209 A1 | 1/2006 | Rieser et al. |
| 2006/0045196 A1 | 3/2006 | Reid |
| 2006/0062320 A1 | 3/2006 | Luz et al. |
| 2006/0062391 A1 | 3/2006 | Lee et al. |
| 2006/0084444 A1 | 4/2006 | Kossi et al. |
| 2006/0088187 A1 | 4/2006 | Clarkson et al. |
| 2006/0165100 A1 | 7/2006 | Huang et al. |
| 2006/0171445 A1 | 8/2006 | Batra et al. |
| 2006/0178124 A1 | 8/2006 | Sugar |
| 2006/0227889 A1 | 10/2006 | Uchida et al. |
| 2006/0233147 A1 | 10/2006 | Karabinis |
| 2006/0239334 A1 | 10/2006 | Kwon et al. |
| 2007/0004465 A1 | 1/2007 | Papasakellariou et al. |
| 2007/0015460 A1 | 1/2007 | Karabinis et al. |
| 2007/0032890 A1 | 2/2007 | Zhou et al. |
| 2007/0041311 A1 | 2/2007 | Baum et al. |
| 2007/0053449 A1 | 3/2007 | Adachi |
| 2007/0177680 A1 | 8/2007 | Green et al. |
| 2007/0211786 A1 | 9/2007 | Shattil |
| 2007/0216488 A1 | 9/2007 | Kultgen |

(56) References Cited

U.S. PATENT DOCUMENTS

| | | | |
|---|---|---|---|
| 2007/0238475 A1 | 10/2007 | Goedken | |
| 2007/0248194 A1 | 10/2007 | Lu | |
| 2007/0271606 A1 | 11/2007 | Amann et al. | |
| 2007/0281693 A1 | 12/2007 | Ballentin et al. | |
| 2007/0285308 A1 | 12/2007 | Bauregger et al. | |
| 2008/0019341 A1 | 1/2008 | Perlman | |
| 2008/0136473 A1 | 6/2008 | Bollenbeck et al. | |
| 2008/0167003 A1 | 7/2008 | Wang et al. | |
| 2008/0187066 A1 | 8/2008 | Wang et al. | |
| 2008/0215888 A1 | 9/2008 | Barriga et al. | |
| 2008/0229108 A1 | 9/2008 | Chase-Salerno et al. | |
| 2008/0304605 A1 | 12/2008 | Aziz et al. | |
| 2009/0092041 A1 | 4/2009 | Juang | |
| 2009/0110033 A1 | 4/2009 | Shattil | |
| 2009/0168730 A1 | 7/2009 | Baum et al. | |
| 2009/0168844 A1 | 7/2009 | Larsson | |
| 2009/0252257 A1 | 10/2009 | Sadowsky et al. | |
| 2009/0279422 A1 | 11/2009 | Fonseka et al. | |
| 2009/0282472 A1 | 11/2009 | Hamilton, II et al. | |
| 2010/0002789 A1 | 1/2010 | Karabinis | |
| 2010/0024042 A1 | 1/2010 | Motahari et al. | |
| 2010/0070874 A1 | 3/2010 | Adamczyk et al. | |
| 2010/0109771 A1* | 5/2010 | Baik | H04B 7/15585 330/149 |
| 2010/0121617 A1 | 5/2010 | Gruener et al. | |
| 2010/0151858 A1* | 6/2010 | Brisebois | H04W 24/10 455/434 |
| 2010/0178874 A1 | 7/2010 | Chiou et al. | |
| 2011/0080877 A1 | 4/2011 | Nentwig | |
| 2011/0123028 A1 | 5/2011 | Karabinis | |
| 2011/0219423 A1 | 9/2011 | Aad et al. | |
| 2011/0222495 A1 | 9/2011 | Li et al. | |
| 2011/0227665 A1 | 9/2011 | Wyville | |
| 2011/0228989 A1 | 9/2011 | Burton | |
| 2012/0039379 A1 | 2/2012 | Husen et al. | |
| 2012/0093093 A1* | 4/2012 | Frenger | H04B 7/0452 370/329 |
| 2012/0201153 A1 | 8/2012 | Bharadia et al. | |
| 2012/0201173 A1 | 8/2012 | Jain et al. | |
| 2013/0225099 A1 | 8/2013 | Vosburgh et al. | |
| 2014/0198766 A1* | 7/2014 | Siomina | H04W 72/082 370/330 |
| 2015/0043419 A1* | 2/2015 | Boudreau | H04B 7/026 370/315 |

FOREIGN PATENT DOCUMENTS

| | | |
|---|---|---|
| EP | 1 589 712 A2 | 10/2005 |
| WO | WO 2005/036790 A1 | 4/2005 |
| WO | WO 2007/001707 A2 | 1/2007 |
| WO | WO 2012/030658 A2 | 3/2012 |
| WO | WO 2013/056270 A1 | 4/2013 |
| WO | WO 2013/130818 A1 | 9/2013 |

OTHER PUBLICATIONS

International Search Report Corresponding to International Patent Application No. PCT/US2011/049399 (dated Mar. 2, 2012).
International Search Report and Written Opinion Corresponding to International Patent Application No. PCT/US2013/028338 (dated Jul. 25, 2013).
Communication of European Publication Number and Information on the Application of Article 67(3) EPC for European Patent Application No. 11822404.7 (dated Jun. 12, 2013).
International Search Report and Written Opinion Corresponding to International Patent Application No. PCT/US2012/066259 (dated Mar. 28, 2013).
Commonly assigned, co-pending U.S. Appl. No. 13/781,226 for "Methods, Systems, and Computer Readable Media for Mitigation of In-Band Interference of Global Positioning System (GPS) Signals", (unpublished, filed Feb. 28, 2013).
Bharadia et al. "Full Duplex Radios", pp. 1-12 (Aug. 12, 2013).
Jain et al. "Practical, Real-time, Full Duplex Wireless", pp. 1-12 (Sep. 19, 2011).
U.S. Appl. No. 61/485,980 for "Adaptive Techniques for Full-Duplex Wireless" (May 13, 2011).
U.S. Appl. No. 61/462,493 for "Single Channel Full-Duplex Wireless Communication" (Feb. 3, 2011).
Choi et al. "Achieving Single Channel, Full Duplex Wireless Communication", pp. 1-12 (Sep. 20, 2010).
Wogan T. "Neutrino-based communication is a first", Mar. 19, 2012, Physics World, retrieved from URL: http://physicsworld.com/cws/article/news/2012/mar/19/neutrino-based-communication-is-a-first.
KurweilAI, Accelerating Intelligence. News, "First communication using neutrinos", Mar. 15, 2012, retrieved from the internet at URL: http://www.kurzweilai.net/first-communication-usinq-neutrinos.
Stancil et al. "Demonstration of Communication Using Neutrinos", Modern Physics Letters A, Apr. 10, 2012, WSPC/Instruction File, Neutrino to MPLA, retrieved from the internet at URL: http://arxiv.org/abs/1203.2847.
University of Rochester, "Researchers Send "Wireless" Message Using Elusive Particles", Mar. 14, 2012, retrieved from the internet at URL: http://www.rochester.edu/news/show.php?id=4022.
Ouellette J. "Neutrino Beam Sends Message Through Solid Rock", Mar. 20, 2012, retrieved from the internet at URL: http://news.discovery.com/space/minerva-sends-a-message-in-a-neutrino-beam-120320.htm.
Atkinson N. "Hailing Frequencies Open? Communication via Neutrinos Tested Successfully", Apr. 11, 2012, Universe Today, retrieved from the internet at URL: http://www.universetoday.com/94536/hailing-frequencies-open-communication-via-neutrinos-tested-successfully/.
Gilster P. "Neutrino Communications: An Interstellar Future?", Apr. 18, 2012, Centauri Dreams, retrieved from the internet at URL: http://www.centauri-dreams.org/?p=22593.
MIT Technology Review, Emerging Technology From the arXiv, "How Neutrinos Could Revolutionize Communications with Submarines", Oct. 5, 2009, retrieved from the internet at URL: http://www.technologyreview.com/view/415579/how-neutrinos-could-revolutionize-communications-with-submarines/.
Pasachoff J. et al. "Neutrinos for Interstellar Communication" Cosmic Search, vol. 1, No. 3, Sep. 21, 2004, retrieved from the internet at URL: http://www.bigear.org/vol1no3/neutrino.htm.
3G Americas, "UMTS Evolution from 3GPP Release 7 to Release 8 HSPA and SAE/LTE", Jul. 2007, 89 pp.
3GPP/LTE Advanced, "$3^{rd}$ Generation Partnership Project: Technical Specification Group Radio Access Network; Evolved Universal Terrestrial Radio Access (E-UTRA); Physical channels and modulation (Release 10)", 3GPP TS 36.211, V10.0.0, Dec. 2010, 103 pp.
Agilent Technologies, "Introducing LTE-Advanced", Application Note, Retrieved from the internet at URL: http://cp.literature.agilent.com/litweb/pdf/5990-6706EN.pdf , Printed in USA, Mar. 8, 2011, 36 pages.
Akan et al. "ATL: An Adaptive Transport Layer Suite for Next-Generation Wireless Internet", *IEEE Journal on Selected Areas in Communications*, vol. 22, No. 5, Jun. 2004, 802-817.
Akyildiz et al. "AdaptNet: An Adaptive Protocol Suite for the Next-Generation Wireless Internet", *IEEE Communications Magazine*, Mar. 2004, 128-136.
Akyildiz et al. "Wireless mesh networks: a survey", *Computer Networks*, vol. 47 (4), 2005, 445-487.
Benvenuto et al., "On the Comparison Between OFDM and Single Carrier Modulation With a DFE Using a Frequency-Domain Feedforward Filter", *IEEE Transactions on Communications*, vol. 50, No. 6, Jun. 2002, pp. 947-955.
Brodersen et al. "CORVUS: A Cognitive Radio Approach for Usage of Virtual Unlicensed Spectrum", *Berkeley Wireless Research Center (BWRC)*, White Paper, 2004, 21 pp.
Brüninghaus et al., "Multi-Carrier Spread Spectrum and Its Relationship to Single Carrier Transmission", $48^{th}$ *IEEE Vehicular Technology Conference*, Ottawa, Ontario, vol. 3, May 18-21, 1998, pp. 2329-2332.
Buddhikot et al. "DIMSUMNet: New Directions in Wireless Networking Using Coordinated Dynamic Spectrum Access", *Proceed-

(56) References Cited

OTHER PUBLICATIONS ings of the Sixth IEEE International Symposium on a World of Wireless Mobile and Multimedia Networks (WoWMoM '05), 2005, 8 pp.

Cabric et al. "A Cognitive Radio Approach for Usage of Virtual Unlicensed Spectrum", Proceedings of the 14th IST Mobile and Wireless Communications Summit, Jun. 2005, 5 pp.

Cabric et al. "Implementation Issues in Spectrum Sensing for Cognitive Radios", Proc. 38th Asilomar Conference on Signals, Systems and Computers, Nov. 2004, 772-776.

Carroll "Chaotic communications that are difficult to detect" Physical Review E 67(2):26207-1-26207-6 (2003).

Charalabopoulos et al. "Pre- post- and balanced equalization in OFDM", Vehicular Technology Conference, 2003. VTC 2003—Fall. 2003 IEEE 58th Orlando, FL, USA; Oct. 6-9, 2003; Piscataway, NJ USA, IEEE, US, vol. 5, Oct. 6, 2003, pp. 3145-3148.

Dahlman E. et al. "3G Evolution HSPA and LTE for Mobile Broadband", 2008, Elsevier Ltd., Oxford US, pp. 383-387.

Dahlman E. et al., 3G Evolution: HSPA and LTE for Mobile Broadband—2d Edition, (Burlington, MA: Academic Press, 2008), Chapter 4, pp. 43-64.

Dahlman, "3G long-term evolution", Telefon AB LM Ericsson, 2005, 36 pp.

Darpa XG Working Group, "The XG Architectural Framework, Request for Comments, V1.0", Prepared by BBN Technologies, Cambridge, MA, US, Jul. 2003, 16 pp.

Darpa XG Working Group, "The XG Vision, Request for Comments, V2.0", Prepared by BBN Technologies, Cambridge MA, US, Jan. 2004, 17 pp.

Digham et al. "On the Energy Detection of Unknown Signals over Fading Channels", Proc. IEEE ICC 2003, vol. 5, May 2003, 3575-3579.

Dinis et al., "A Multiple Access Scheme for the Uplink of Broadband Wireless Systems", IEEE Global Telecommunications Conference, Nov. 29-Dec. 3, 2004, vol. 6, pp. 3808-3812.

Dollard P.M. "On the time-bandwidth concentration of signal functions forming given geometric vector configurations", IEEE Transactions on Information Theory, Oct. 1964, pp. 328-338.

Ekström et al., "Technical Solutions for the 3G Long-Term Evolution", IEEE Communications Magazine, vol. 44, No. 3, Mar. 2006, pp. 38-45.

Esteves "The High Data Rate Evolution of the cdma2000 Cellular System", Appeared in Multiaccess, Mobility and Teletraffic for Wireless Communications, vol. 5, Kluwer Academic Publishers, 2000, pp. 61-72.

Falconer et al., "Frequency Domain Equalization for Single-Carrier Broadband Wireless Systems", IEEE Communications Magazine, vol. 40, No. 4, Apr. 2002, pp. 58-66.

Federal Communications Commission, FCC 03-289, Notice of Inquiry and Notice of Proposed Rulemaking, Nov. 2003, 31 pp.

Federal Communications Commission, FCC 03-322, Notice of Proposed Rule Making and Order, Dec. 2003, 53 pp.

Galda et al., "A Low Complexity Transmitter Structure for OFDM-FDMA Uplink Systems" IEEE 55th Vehicular Technology Conference, 2002, vol. 4, May 2002, pp. 1737-1741.

Gardner "Signal Interception: A Unifying Theoretical Framework for Feature Detection" IEEE Transactions on Communications 36(8):897-906 (1988).

Gessner et al., "LTD technology and LTE test; a deskside chat", Rohde & Schwarz, Apr. 2009, 92 pp.

Grandblaise et al. "Dynamic Spectrum Allocation (DSA) and Reconfigurability", Proceeding of the SDR 02 Technical Conference and Product Exposition, Nov. 2002, 6 pp.

Haykin "Cognitive Radio: Brain-Empowered Wireless Communications", IEEE Journal on Selected Areas in Communications, vol. 23, No. 2, Feb. 2005, 201-220.

Haykin, S., Adaptive Filter Theory, 1986, Prentice-Hall, pp. 173,301,497.

Hillenbrand et al. "Calculation of Detection and False Alarm Probabilities in Spectrum Pooling Systems", IEEE Communications Letters, vol. 9, No. 4, Apr. 2005, 349-351.

Holma et al. "LTE for UMTS—OFDMA and SC-FDMA Based Radio Access" 2009, John Wiley & Sons, Ltd., Chichester UK, pp. 76-82.

Horne "Adaptive Spectrum Access: Using the Full Spectrum Space", Proc. Telecommunications Policy Research Conference (TPRC), Sep. 2003, 15 pp.

Hoven et al., "Some Fundamental Limits on Cognitive Radio", PowerPoint presentation, Wireless Foundations, EECS, University of California at Berkeley, Feb. 11, 2005, 16 pp.

International Preliminary Report on Patentability, PCT International Application No. PCT/US09/01152, dated Nov. 8, 2010.

International Search Report and Written Opinion, PCT International Application No. PCT/US2009/003495, dated Nov. 26, 2009.

Invitation to Pay Additional Fees corresponding to International Application No. PCT/US2010/029028; dated Jan. 28, 2011; 11 pages.

Ishii, "Draft2 Report of 3GPP TSG RAN WG1 #40bis in Beijing (Beijing, China, Apr. 4-8, 2005)", R1-050376, Agenda Item 3, 3GPP TSG RAN WG1 Meeting #41, Athens, Greece, May 9-13, 2005, 65 pp.

Ixia "SC-FDMA Single Carrier FDMA in LTE" White Paper, Rev. A, Nov. 2009, 16 pp.

Jondral "Software-Defined Radio-Basics and Evolution to Cognitive Radio", EURASIP Journal on Wireless Communications and Networking, 2005:3, 275-283.

Jungnickel V. et al., "Synchronization of Cooperative Base Stations", IEEE International Symposium on Wireless Communications Systems; Oct. 21-24, 2008, 6 pages.

Kanodia et al. "MOAR: A Multi-channel Opportunistic Auto-rate Media Access Protocol for Ad Hoc Networks", Proceedings of the First International Conference on Broadband Networks (BROADNETS '04), Oct. 2004, 600-610.

Karabinis "Increased Capacity Communications for OFDM-Based Wireless Communications Systems/Methods/Devices", U.S. Appl. No. 12/748,931, filed Mar. 29, 2010.

Landau H.J. & Pollak H.O., "Prolate spheroidal wave functions, Fourier analysis and uncertainty—III: The dimension of the space of essentially time- and band-limited signals", Bell System Technical Journal, 41, pp. 1295-1336, Jul. 1962.

Leaves et al. "Dynamic Spectrum Allocation in Composite Reconfigurable Wireless Networks", IEEE Communications Magazine, vol. 42, May 2004, 72-81.

Lim et al., "Channel-Dependent Scheduling of Uplink Single Carrier FDMA Systems" IEEE 64th Vehicular Technology Conference, Montreal, Quebec, Sep. 25-28, 2006, pp. 1-5.

Mietzner et al. "Multiple-antenna techniques for wireless communications—a comprehensive literature survey", IEEE Communications Surveys, IEEE, New York, NY, US; vol. 11, No. 2, Apr. 1, 2009, pp. 87-105.

Mitola III "Cognitive Radio for Flexible Mobile Multimedia Communications", IEEE International Workshop on Mobile Multimedia Communications (MoMuC), Nov. 1999, 3-10.

Mitola III et al. "Cognitive Radio: Making Software Radios More Personal", IEEE Personal Communications, vol. 6, Issue 4, Aug. 1999, 13-18.

Mitola III, Dissertation "Cognitive Radio—An Integrated Agent Architecture of Software Defined Radio", Royal Institute of Technology, May 8, 2000, 313 pp.

Motorola, "R1-050971 Single Carrier Uplink Options for E-UTRA: IFDMA/DFT-SOFDM Discussion and Initial Performance Results", 3GPP TSG RAN WG1 #42, London, United Kingdom, Agenda Item: 10.3, Aug. 29-Sep. 2, 2005, 30 pp.

Motorola, "Uplink Numerology and Frame Structure", 3GPP TSG RAN1#41 Meeting, Athens, Greece, Agenda Item 13.2, May 9-13, 2005, 10 pp.

Murty R. "Software-defined reconfigurability radios: smart, agile, cognitive, and interoperable", downloaded Nov. 12, 2013 from http://www.siliconinvestor.com/readmsg.aspx?msgid-19066134, 4 pp.

(56) References Cited

OTHER PUBLICATIONS

Myung et al., "Single Carrier FDMA for Uplink Wireless Transmission", *IEEE Vehicular Technology Magazine*, Sep. 2006, pp. 30-38.

Nedic, Slobodan et al. "Per-Bin DFE for Advanced OQAM-based Multi-Carrier Wireless Data Transmission Systems." *2002 International Zurich Seminar on Broadband Communications Access—Transmission—Networking.* (2002): 38-1-38-6. Print.

Nokia, "Uplink Considerations for UTRAN LTE", 3GPP TSG RAN WG1 #40bis, Beijing, China, R1-050251, Agenda Item 12.2.1, Apr. 4-8, 2005, 8 pp.

Notification of Transmittal of the International Search Report and the Written Opinion of the International Searching Authority, or the Declaration, International Search Report, Written Opinion of the International Searching Authority, PCT Application No. PCT/US2009/001152, dated May 7, 2009.

Price R. et al., "A Communication Technique for Multipath Channels", *Proceedings of the IRE*, 1958, vol. 46, pp. 555-570.

Proakis, Digital Communications, McGraw-Hill Book Company, 1983, pp. 580-583.

Proakis, John G. *Digital Communications*, 1983, McGraw-Hill, pp. 479.

Rumney, "3GPP LTE: Introducing Single-Carrier FDMA", *Agilent Measurement Journal*, Jan. 1, 2008, 10 pp.

Sahai et al. "Some Fundamental Limits on Cognitive Radio", *Allerton Conf. on Commun., Control and Computing*, 2004, Oct. 2004, 11 pp.

Sari et al., "Transmission Techniques for Digital Terrestrial TV Broadcasting", *IEEE Communications Magazine*, vol. 33, No. 2, Feb. 1995, pp. 100-109.

Schilling D.L. et al., "Optimization of the Processing Gain on an M-ary Direct Sequence Spread Spectrum communication System", IEEE Transactions on Communications, vol. Com-28, No. 8, Aug. 1980, pp. 1389-1398.

Song et al. "Cross-Layer Optimization for OFDM Wireless Networks—Part II: Algorithm Development", *IEEE Transactions on Wireless Communications*, vol. 4, No. 2, Mar. 2005, pp. 625-634.

Sorger et al., "Interleaved FDMA—A New Spread-Spectrum Multiple-Access Scheme", *IEEE International Conference on Communications*, vol. 2, Jun. 7-11, 1998, pp. 1013-1017.

Taub and Schilling, Principles of Communication Systems, Second Edition, McGraw-Hill Publishing Company, 1986, pp. 729-732.

Torrieri, Principles of Military Communication Systems, Artech, 1981, pp. 65-67.

Tran, Thien-Toan et al., "Overview of enabling technologies for 3GPP LTE-advanced", *EURASIP Journal on Wireless Communications and Networking*, 2012, vol. 54, 12 Pages.

U.S. Appl. No. 60/692,932, filed Jun. 22, 2005, Peter D. Karabinis, "Communications systems, methods, devices and computer program products for low probability of intercept (PLI), low probability of detection (LPD) and/or low probability of exploitation (LPE) of communications information".

U.S. Appl. No. 60/698,247, filed Jul. 11, 2005, Peter D. Karabinis, "Additional communications systems, methods, devices and/or computer program products for low probability of intercept (PLI), low probability of detection (LPD) and/or low probability of exploitation (LPE) of communications information and/or minimum interference communications".

U.S. Appl. No. 61/033,114, filed Mar. 3, 2008, Peter D. Karabinis, "Next Generation (Xg) Chipless Spread-Spectrum Communications (Cssc)".

Weiss et al. "Efficient Signaling of Spectral Resources in Spectrum Pooling Systems", *Proceedings of the 10$^{th}$ Symposium on Communications and Vehicular Technology (SCVT)*, Nov. 2003, 6 pp.

Weiss et al. "Spectrum Pooling: An Innovative Strategy for the Enhancement of Spectrum Efficiency", *IEEE Radio Communications Magazine*, 2004, 8-14.

Widrow B., Stearns S.D., *Adaptive Signal Processing*, 1985, Prentice-Hall, Inc., pp. 183.

Wikipedia contributors, "Orthogonal frequency-division multiplexing," *Wikipedia, The Free Encyclopedia*, http://en.wikipedia.org/w/index.php?title=Orthogonal_frequency-division_multiplexing&oldid=489673844 (accessed Apr. 25, 2012).

Xu et al. "DRiVE-ing to the Internet: Dynamic Radio for IP Services in Vehicular Environments", *Proceedings of the 25$^{th}$ Annual IEEE Conference on Local Computer Networks*, Nov. 2000, 281-289.

Zhang et al., "A Novel Direct Waveform Synthesis Technique With Carrier Frequency Programmable", *IEEE Wireless Communications and Networking Conference*, 2002, pp. 150-154.

Zhang H. et al., "Base Station Cooperation for Multiuser MIMO: Joint Transmission and BS Selection", *2004 Conference on Information Sciences and Systems*, Princeton University, Mar. 17-19, 2004, 6 pages.

Zheng et al. "Collaboration and Fairness in Opportunistic Spectrum Access", *Proceedings IEEE ICC 2005*, vol. 5, May 2005, 3132-3136.

Ziemer and Peterson, Digital Communications and Spread Spectrum Systems, Macmillan Publishing Company, 1985, pp. 348-349.

\* cited by examiner

US 9,806,790 B2

SYSTEMS/METHODS OF SPECTRALLY EFFICIENT COMMUNICATIONS

CLAIM FOR PRIORITY

This application claims priority to U.S. Provisional Application No. 61/868,151, filed Aug. 21, 2013, entitled Systems/Methods of Interference Cancellation at a Receiving Element Enabling Multiple Intra-Sector Frequency Reuse, which is incorporated herein by reference in its entirety as if fully set forth herein.

This application is also a continuation-in-part of U.S. patent application Ser. No. 13/767,537, filed Feb. 14, 2013, entitled Systems/Methods of Carrier Aggregation Providing Increased Capacity Communications, which itself is a continuation of U.S. patent application Ser. No. 13/528,058, filed Jun. 20, 2012, entitled Increased Capacity Communications for OFDM-Based Wireless Communications Systems/Methods/Devices, which itself is a continuation of U.S. patent application Ser. No. 12/748,931, filed Mar. 29, 2010, entitled Increased Capacity Communications for OFDM-Based Wireless Communications Systems/Methods/Devices, the disclosures of all of which are incorporated herein by reference in their entirety as if set fully herein.

FIELD

Embodiments of the inventive concepts relate to communications systems/methods, and more specifically to wireless communications systems/methods that maximize spectrum efficiency/reuse and/or minimize electromagnetic spectrum bandwidth requirements.

BACKGROUND

Wireless communications systems/methods are increasingly being used to provide voice, data and/or multimedia services. As the use of wireless systems/methods continues to increase, limited availability in electromagnetic spectrum may adversely constraint such systems/methods in their ability to transmit/receive voice/data/multimedia content effectively and at a rate that is satisfactory to end users.

SUMMARY

U.S. application Ser. No. 13/767,537, filed by the present inventor on Feb. 14, 2013 entitled Systems/Methods of Carrier Aggregation Providing Increased Capacity Communications (corresponding to U.S. Publication No. 2013/0170569), the entirety of which is incorporated herein by reference, teaches (among other things) that if N antennas are used to radiate a signal, in lieu of using a single antenna to radiate the signal, wherein each one of the N antennas radiates 1/Nth of an aggregate signal power (that would have been radiated by the single antenna) and wherein each one of the N antennas (or each one of N respective transmitter chains associated with the N respective antennas) accounts for a channel response between itself and an intended receiver, then a signal-to-noise ratio at the intended receiver may be increased by a factor of N (relative to the single transmit antenna configuration) by having the N appropriately conditioned replicas of the transmitted signal combine coherently, on a voltage basis, at an antenna of the intended receiver (see FIG. 17 of the above cited application and the description thereof in, for example, paragraph [00197] of the above cited application).

Various embodiments described herein arise from a recognition that, given the teachings of application Ser. No. 13/767,537, a corollary to principles disclosed therein comprises using first and second transmitting/emitting/radiating elements (e.g., radio frequency antennas, light-emitting diodes, lasers, etc.) to concurrently launch respective first and second signals that are related to one another; wherein each one of the first and second signals comprises a desired component, from a common desired source, and an interference component from a common interfering source that may be using at least some resources/frequencies as the desired source. The first and second radiating elements may be configured to launch the first and second signals, respectively, properly conditioned, so that upon interception by a receiving element (e.g., an antenna of a radio frequency receiver, a photo-detector of an optical/infrared/ultraviolet receiver), the interference components of the first and second signals may at least partially add destructively at the receiving element and in some embodiments may substantially cancel each other thereat, whereas the desired components of the first and second signals may avoid substantial cancellation between one another at the receiving element (owing to a phase relationship therebetween that differs vis-à-vis a phase relationship between the interference components). The technique may improve a signal-to-interference ratio allowing for an increase in intra-sector co-channel/co-frequency operation of multiple transmitters.

Embodiments of the inventive concepts can apply to military systems/methods to create a "shield against interference," and also can apply to commercial/civilian/government systems/methods (particularly to cellular systems/methods and/or home/office systems/methods) to improve spectral efficiency therein, by allowing multiple intra-sector and/or inter-sector frequency reuse, thus easing the spectrum shortage that is currently developing rapidly due to the explosive usage of smartphones and other devices. Embodiments of the inventive concepts can provide reduced interference communications for military applications (e.g., communications that are substantially devoid of jamming), and further can provide access to additional effective spectrum for commercial operations. Some embodiments can double an effective spectral efficiency. Other embodiments can increase spectral efficiency beyond a doubling thereof.

Further embodiments of the inventive concepts can provide wireless communications based upon a transmission/reception of particles (i.e., a corpuscular transmission/reception) instead of, or in combination with, an electromagnetic transmission/reception. Some embodiments use an electromagnetic transmission/reception and a corpuscular transmission/reception. A corpuscular transmission/reception (and/or any transmission/reception that is not based upon electromagnetic waves) does not consume frequencies of the electromagnetic spectrum and can thus provide a capacity beyond that offered by electromagnetic spectrum alone. A system/method, used to convey information, comprising other than transmission/reception of electromagnetic waves (not necessarily to the exclusion of transmission/reception of electromagnetic waves), may be based upon particle transmission/reception, sound wave transmission/reception and/or gravitational wave transmission/reception, etc. (such system(s)/method(s) referred to herein as "foreus"). Embodiments of the inventive concepts provide systems/methods of foreus-based communications on a forward link and electromagnetic-based communications on a return link and/or foreus-based communications on a return link and electromagnetic-based communications on a forward link. Further, the inventive concepts provide links (forward/return) that are based upon a combination of foreus-based communications and electromagnetic-based communications.

More specifically, according to embodiments of the inventive concepts, a communications method is provided comprising: transmitting by a first wireless transmitter a first signal that comprises a desired component that is related to a desired signal and an interference component that is related to an interference signal; the desired signal and the interference signal being generated by respective physically distinct desired and interfering sources that are independent of one another; transmitting by a second wireless transmitter a second signal that comprises a desired component that is related to the desired signal and an interference component that is related to the interference signal; and concurrently wirelessly receiving at a receiving element the first and second signals, so that respective components thereof that are related to the interference signal at least partially cancel one another at the receiving element.

According to further embodiments the method further comprises: receiving by a first wireless receiver, that is connected to the first wireless transmitter, a measure of the desired signal and a measure of the interference signal; receiving by a second wireless receiver, that is connected to the second wireless transmitter, a measure of the desired signal and a measure of the interference signal; and processing the measure of the desired signal and the measure of the interference signal that are received by the second wireless receiver to generate the second signal.

According to additional embodiments, the desired signal comprises $N \geq 2$ subcarriers and the interference signal comprises $M \geq 2$ subcarriers, the method further comprising: wirelessly transmitting, using a set of frequencies, the N subcarriers to/from a first device that is being served by a sector of a base station; and wirelessly transmitting, concurrently with said wirelessly transmitting the N subcarriers, the M subcarriers to/from a second device that is being served by the sector of the base station using at least some frequencies of the set of frequencies.

In yet other embodiments of the inventive concepts, said processing comprises: frequency shifting and phase adjusting and may also comprise, according to some embodiments, Fourier transforming and inverse Fourier transforming; wherein said frequency shifting comprises: frequency shifting from a cellular band of frequencies to a band of frequencies outside of the cellular band of frequencies.

In yet further embodiments of the inventive concepts, said transmitting by the second wireless transmitter a second signal comprises: transmitting by the second wireless transmitter the second signal using frequencies of said band of frequencies outside of the cellular band of frequencies.

In other embodiments of the inventive concepts, the method provided further comprises: receiving at each one of the first and second wireless receivers first and second measures of respective first and second desired signals, that are generated by respective first and second desired sources that are physically distinct and independent of one another; the first and second desired sources using respective first and second mutually exclusive frequencies to generate the first and second desired signals, respectively; receiving, at each one of the first and second wireless receivers first and second measures of respective first and second interference signals, that are generated by respective first and second interference sources that are physically distinct and independent of one another, concurrently with said receiving the first and second desired signals; the first and second interference sources using the first and second mutually exclusive frequencies to generate the first and second interference signals, respectively; and commanding the second interference source to use the first frequency in generating the second interference signal responsive to a phase measurement.

Additional embodiments of the inventive concepts provide a system comprising: a first receiver that is configured to receive a measure of a desired signal and a measure of an interference signal; a second receiver that is configured to receive a measure of the desired signal and a measure of the interference signal; a first transmitter that is connected to the first receiver and is configured to form and transmit a first signal that is related to the desired signal and interference signal; and a second transmitter that is connected to the second receiver and is configured to form and transmit a second signal that is related to the desired signal and interference signal; wherein the first and second transmitters are configured to transmit the respective first and second signals so that respective components thereof that are related to the interference signal at least partially cancel one another at a receiving element.

According to some embodiments, the first receiver comprises a wireless receiver and the second receiver comprises a wireless receiver.

According to yet additional embodiments, the desired signal comprises $N \geq 2$ subcarriers and the interference signal comprises $M \geq 2$ subcarriers; wherein a subcarrier n of the N subcarriers of the desired signal, $1 \leq n \leq N$, received by the first receiver, differs in amplitude and/or phase from the same subcarrier received by the second receiver; and wherein a subcarrier m of the M subcarriers of the interference signal, $1 \leq m \leq M$, received by the first receiver, differs in amplitude and/or phase from the same subcarrier received by the second receiver.

In other embodiments, the first transmitter that is connected to the first receiver and is configured to form and transmit the first signal, comprises a wireless transmitter that is configured to form and transmit said first signal and is further configured to frequency shift the measure of the desired signal and the measure of the interference signal that are received by the first receiver; and wherein the second transmitter that is connected to the second receiver and is configured to form and transmit the second signal comprises a wireless transmitter that is configured to form and transmit said second signal and is further configured to frequency shift and phase adjust the measure of the desired signal and the measure of the interference signal that are received by the second receiver.

According to further embodiments, the second transmitter is further configured to amplitude adjust the measure of the desired signal and the measure of the interference signal that are received by the second receiver; and according to yet further embodiments of the inventive concepts, each one of the first and second transmitters is further configured to: frequency shift the measure of the desired signal and the measure of the interference signal that are received by the respective receiver connected thereto from a cellular band of frequencies, at which the measure of the desired signal and the measure of the interference signal are received at the first receiver and at the second receiver, to a band of frequencies outside of the cellular band of frequencies; wherein said band of frequencies outside of the cellular band of frequencies comprises, according to some embodiments, optical frequencies, infrared frequencies and/or ultraviolet frequencies.

According to additional embodiments, the first transmitter is configured to transmit a frequency shifted measure of the desired signal and a frequency shifted measure of the interference signal and the second transmitter is configured to transmit a frequency shifted and phase adjusted measure of the desired signal and a frequency shifted and phase adjusted measure of the interference signal so that at the receiving element components thereof relating to interference add substantially destructively therebetween.

Other embodiments of the inventive concepts are also possible in which each one of the first and second receivers is configured to: receive first and second measures of respective first and second desired signals, that are generated by respective first and second desired sources that are physically distinct and independent therebetween; the first and second desired sources using respective first and second mutually exclusive frequencies to generate the first and second desired signals, respectively; and further receive first and second measures of respective first and second interference signals, that are generated by respective first and second interference sources that are physically distinct and independent therebetween, concurrently with receiving the first and second desired signals; wherein the first and second interference sources are using the first and second mutually exclusive frequencies to generate the first and second interference signals, respectively.

According to further embodiments, the system provided comprises a processor that is configured to command the second interference source to stop using the second frequency in generating the second interference signal and, instead of the second frequency, use the first frequency, responsive to a phase measurement that is performed by the processor and/or other system element. Also responsive to the phase measurement and/or at least one additional measurement, according to some embodiments of the inventive concepts, the processor may also command the first interference source to stop using the first frequency and, instead of the first frequency, use the second frequency to generate the first interference signal. This switching of frequencies between interference sources provides an improvement in signal-to-noise and/or in signal-to-interference ratio in at least one desired signal.

DETAILED DESCRIPTION

Interference Reduction Embodiments

Figure 1:
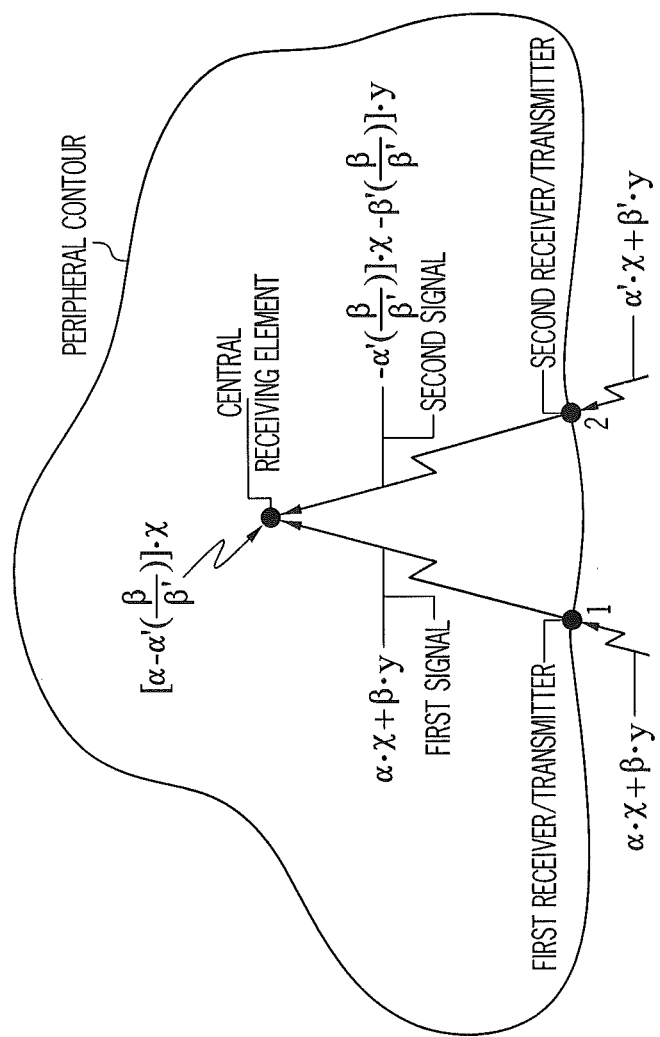
FIG. 1 is a schematic illustration of a base station configuration according to embodiments of the present inventive concepts.

FIG. 1 is illustrative of systems/methods according to various embodiments of the present inventive concepts. Referring to FIG. 1, a first element, labeled as "1," and comprising a First Receiver and a First Transmitter ("FIRST RECEIVER/TRANSMITTER"), that are connected to one another and may, according to some embodiments, be substantially co-located, is configured to receive a weighted version of a desired signal, "$\alpha \cdot \chi$," from a desired source such as, for example, a first mobile device (not shown), e.g., a first smartphone; wherein "$\chi$" denotes the desired signal that is transmitted by the desired source and "$\alpha$" denotes a channel amplitude/phase that the desired signal $\chi$ is subjected to in propagating from the desired source to the First Receiver. The First Receiver also receives, concurrently with the weighted version of the desired signal, a weighted version of an interfering signal, denoted by "$\beta \cdot y$" from an interfering source such as, for example, a second mobile device (not shown), e.g., a second smartphone, that is transmitting the interfering signal "y" concurrently and/or co-channel/co-frequency with the desired signal $\chi$ that is being transmitted by the first mobile device; wherein "$\beta$" denotes a channel amplitude/phase that the interfering signal y is subjected to in propagating from the interfering source to the First Receiver; and wherein "$\alpha$" and "$\beta$" may be real-, imaginary-, complex-valued and/or may be varying with time.

Still referring to FIG. 1, weighted versions of the desired and interfering signals, $\chi$ and y, respectively, are also intercepted by a second element, labeled as "2," comprising a Second Receiver and a Second Transmitter ("SECOND RECEIVER/TRANSMITTER") that are connected to one another and may, according to some embodiments, be substantially co-located. Channel responses to the Second Receiver will, in general, differ from those associated with the First Receiver, as is indicated by the primed channel amplitude/phase responses, $\alpha'$ and $\beta'$, respectively; wherein, $\alpha'$ and $\beta'$ may be real-, imaginary-, complex-valued and/or may be varying with time. Still referring to FIG. 1, it will be understood that first and second aggregate signals, ($\alpha \cdot \chi + \beta \cdot y$) and ($\alpha' \cdot \chi + \beta' \cdot y$), received at element 1 and element 2, respectively, may be received at the First and Second Receivers thereof, respectively, as is illustrated in FIG. 1, over frequencies of a cellular frequency band if, for example, the desired and interfering sources comprise cellular devices (e.g., cellular smartphones). The inventive concepts, however, are not limited to any specific frequency band and may be applied to any set of frequencies of any frequency band. Further, according to some embodiments, the desired and interfering signals, $\chi$ and y, respectively, may include respective signals comprising respective first and second pluralities of subcarriers, as may be the case with a 4G LTE standard, protocol, and/or air interface or any variant thereof that is based upon Orthogonal Frequency Division Multiplexing ("OFDM"), Orthogonal Frequency Division Multiple Access ("OFDMA") and/or Single Carrier Frequency Division Multiple access ("SC-FDMA").

According to embodiments of the present inventive concepts, the First Transmitter that is connected to the First Receiver is configured to form/transmit a First Signal ("FIRST SIGNAL") in a direction of a Central Receiving Element ("CENTRAL RECEIVING ELEMENT"), as is illustrated in FIG. 1. The First Signal may, according to embodiments of the inventive concepts, comprise an amplified and/or translated in frequency replica of the first aggregate signal that is received at the First Receiver. In other embodiments, the First Signal may also comprise an amplitude/phase adjustment that may comprise a frequency dependency. In some embodiments, the First Signal may be transmitted by the First Transmitter using any band of frequencies that is not overlapping (i.e., is mutually exclusive) with the frequencies over which the first aggregate signal ($\alpha \cdot \chi + \beta \cdot y$) is received at the First Receiver. In other embodiments, the frequencies may overlap, at least partially. According to embodiments of the inventive concepts, the First Signal may be transmitted over optical frequencies, infrared frequencies, ultraviolet frequencies and/or other frequencies that are non-overlapping with the cellular bands of frequencies (or any other set of frequencies over which the first aggregate signal is received at the First Receiver). For example, the First Signal may be transmitted by the First Transmitter at frequencies above 5 GHz, 10 GHz, 20 GHz and/or 30 GHz. In some embodiments, the distance between the First Transmitter and the Central Receiving Element (see FIG. 1) may be a line-of-sight distance, that may be devoid of obstructions, and may be relatively small (e.g., 10 to 100 meters), allowing for transmission of the First Signal at such high frequencies. In some embodiments of the inventive concepts, the First Receiver/Transmitter and/or the Second Receiver/Transmitter may comprise elements located at a distance/height from the ground (just as base station antennas are located at a distance/height from the ground), and the Central Receiving Element may be located substantially on the ground or near the ground.

The Second Transmitter that is connected to the Second Receiver may be configured to form a Second Signal, $-\alpha'(\beta/\beta')\cdot\chi-\beta'(\beta/\beta')\cdot y$, and transmit the Second Signal in a direction of the Central Receiving Element, as is illustrated in FIG. 1. The Second Signal may, according to embodiments of the inventive concepts, comprise an amplified, weighted and/or translated in frequency version of the second aggregate signal that is received at the Second Receiver. FIG. 1, illustrates that the Second Signal may be adjusted in amplitude/phase relative to an amplitude/phase thereof at the Second Receiver. The Second Signal may be transmitted by the Second Transmitter using the same band of frequencies that is used by the First Transmitter to transmit the First Signal so that upon interception by the Central Receiving Element at least some cancellation of the interfering components may occur at the Central Receiving Element, leaving a remnant of the desired signal. The remnant of the desired signal is expressed as $[\alpha-\alpha'(\beta/\beta')]\cdot\chi$ in FIG. 1, reflecting a weighted, in amplitude/phase, desired signal; in some embodiments, no substantial interfering signal is left. It is anticipated that a zero, or near zero, value of $[\alpha-\alpha'(\beta/\beta')]$ will be associated with a negligibly small probability; this expectation may be verified by Monte Carlo computer simulation. In the event a zero, or near zero, value of $[\alpha-\alpha'(\beta/\beta')]$ occurs, the interfering source, occupying a specific physical location relative to the desired signal source, may be switched with another source, using resources (e.g., frequencies) different from those being used by said interfering source; wherein said switched with another source occupying a physical location other than said specific physical location would likely alter the magnitude and/or phase of $\alpha'(\beta/\beta')$ and, consequently, altering said zero, or near zero, value of $[\alpha-\alpha'(\beta/\beta')]$; and wherein said switched comprises allowing the interfering source to use resources (e.g., frequencies) used by said another source while allowing said another source to use resources (e.g., frequencies) used by said interfering source.

Still referring to FIG. 1, it can be appreciated by those skilled in the art that, subject to the signals $\chi$ and y overlapping in time and space and having been emitted by respective sources (e.g., smartphones) co-frequency therebetween, the signal y causes interference for the signal $\chi$, and the signal $\chi$ causes interference for the signal y. However, having shown how to reduce interference caused by y into $\chi$, those skilled in the art will recognize how to proceed to reduce interference caused by $\chi$ into y. For example, according to some embodiments of the inventive concepts, a second Central Receiving Element (not shown in FIG. 1) may be configured to receive, for example, a signal $(\alpha'\cdot\chi+\beta'\cdot y)$ from a transmitter that is connected to the Second Receiver of FIG. 1, and to also receive $-\alpha(\alpha'/\alpha)\cdot\chi-\beta(\alpha'/\alpha)\cdot y$ from a transmitter that is connected to the First Receiver of FIG. 1 (wherein the transmitter that is connected to the First Receiver of FIG. 1 may also be connected to the Second Receiver of FIG. 1 and/or other element of FIG. 1 that is used, for example, to determine/estimate the parameter $\alpha$). In other embodiments, the second Central Receiving Element (not shown in FIG. 1) may be configured to receive, for example, $(\alpha\cdot\chi+\beta\cdot y)$ from a transmitter that is connected to the First Receiver of FIG. 1, and to also receive a signal such as $-\alpha'(\alpha/\alpha')\cdot\chi-\beta(\alpha/\alpha')\cdot y$ from a transmitter that is connected to the Second Receiver of FIG. 1 (wherein the transmitter that is connected to the First Receiver of FIG. 1 may also be connected to the Second Receiver of FIG. 1 and/or other element of FIG. 1 that is used, for example, to determine/estimate the parameter $\alpha'$).

In embodiments where the second Central Receiving Element is configured as discussed above, and is separate and/or at a distance from the Central Receiving Element shown in FIG. 1 (i.e., the first Central Receiving Element), said second Central Receiving Element may be configured to reuse frequencies being used by the first Central Receiving Element and wirelessly receive signals $(\alpha'\cdot\chi+\beta'\cdot y)$ and $-\alpha(\alpha'/\alpha)\cdot\chi-\beta(\alpha'/\alpha)\cdot y$, or wirelessly receive $(\alpha\cdot\chi+\beta\cdot y)$ and $-\alpha'(\alpha/\alpha')\cdot\chi-\beta'(\alpha/\alpha')\cdot y$, over frequencies that are also being used by the first Central Receiving Element to receive, for example, $(\alpha\cdot\chi+\beta\cdot y)$ and $-\alpha(\alpha'/\alpha)\cdot\chi-\beta(\alpha'/\alpha)\cdot y$ for the purpose of reducing y and processing $\chi$. Other embodiments may be devoid of the second Central Receiving Element and a single Central Receiving Element (i.e., the Central Receiving Element of FIG. 1) may be configured to receive wirelessly, in some embodiments, $(\alpha\cdot\chi+\beta\cdot y)$ and $-\alpha'(\beta/\beta')\cdot\chi-\beta'(\beta/\beta')\cdot y$ from the First Transmitter and Second Transmitter, respectively, using a first set of frequencies, and to extract the signal $\chi$ therefrom as previously explained; and the single Central Receiving Element may also be configured to receive, for example, $(\alpha'\cdot\chi+\beta'\cdot y)$ and $-\alpha(\alpha'/\alpha)\cdot\chi-\beta(\alpha'/\alpha)\cdot y$ from other respective first and second transmitters (not shown in FIG. 1), using a second set of frequencies that differs from the first set of frequencies, and to extract therefrom the signal y. In some embodiments of the inventive concepts that comprise first and second Central Receiving Elements, the first and second Central Receiving Elements may be connected to one another. In other embodiments, comprising one Central Receiving Element, or a plurality of Central Receiving Elements, and a plurality of Receiver/Transmitter elements along the Peripheral Contour (as illustrated in FIG. 1), at least two, and in some embodiments all, of the plurality of Receiver/Transmitter elements may be connected to one another. In yet other embodiments, any first element/component thereof may be connected (wirelessly and/or otherwise) with any other element/component thereof.

It will be understood by those skilled in the art that any Receiver/Transmitter element of the plurality of Receiver/Transmitter elements may comprise any of the systems/methods (in-part, in-whole and/or in-combination) described in U.S. application Ser. No. 13/767,537, filed by the present inventor on Feb. 14, 2013 entitled Systems/Methods of Carrier Aggregation Providing Increased Capacity Communications (corresponding to U.S. Publication No. 2013/0170569); U.S. application Ser. No. 14/155,538, filed by the present inventor on Jan. 15, 2014 entitled Systems/Methods of Spatial Multiplexing; and U.S. application Ser. No. 14/187,899, filed by the present inventor on Feb. 24, 2014 entitled Systems and/or Methods of Wireless Communications, all of which are incorporated herein by reference in their entirety, as if fully set forth herein, including references incorporated therein by reference.

In further embodiments of the inventive concepts comprising a third co-channel/co-frequency source/signal/interferer (not illustrated in FIG. 1), the systems/methods described above and illustrated in FIG. 1 may be configured to include a Third Receiver/Transmitter "3" along the Peripheral Contour of FIG. 1 (not illustrated), wherein the Third Transmitter may be connected to the Third Receiver (along the lines described earlier for the First Receiver/Transmitter and the Second Receiver/Transmitter); and wherein the Third Receiver/Transmitter may be connected to the First Receiver/Transmitter and/or the Second Receiver/Transmitter. In order to process an additional (i.e., third) interference variable, an extension of the systems/methods described thus far for processing the two co-channel/co-frequency signals χ and y may be used, as will be apparent to those skilled in the art. For example, letting the third co-channel/co-frequency signal be denoted by z, the First Receiver will receive $\alpha \cdot \chi + \beta \cdot y + \gamma \cdot z$; the Second Receiver will receive $\alpha' \cdot \chi + \beta' \cdot y + \gamma' \cdot z$; and the Third Receiver will receive $\alpha'' \cdot \chi + \beta'' \cdot y + \gamma'' \cdot z$; where γ, γ', γ", α", and β" denote respective channel responses. It may be seen by those skilled in the art that if, for example, the First Transmitter is configured to transmit to the Central Receiving Element a First Signal $\alpha \cdot \chi + \beta \cdot y + \gamma \cdot z$; the Second Transmitter is configured to transmit to the Central Receiving Element a Second Signal $\delta \cdot (\alpha' \cdot \chi + \beta' \cdot y + \gamma' \cdot z)$; and the Third Transmitter is configured to transmit to the Central Receiving Element a Third Signal $\epsilon \cdot (\alpha'' \chi + \beta'' \cdot y + \gamma'' \cdot z)$, subject to mathematical and/or signal processing constraints of $\beta + \delta \cdot \beta' + \epsilon \cdot \beta'' = 0$ and $\gamma + \delta \cdot \gamma' + \epsilon \cdot \gamma'' = 0$, at least some reduction (e.g., at least some cancellation) of y and z will take place at the Central Receiving Element and the signal χ may be isolated/extracted substantially devoid of interference from the co-channel/co-frequency signals y and z. Further processing, along the lines described thus far, may be used to isolate/extract the signals y and z substantially devoid of interference.

It will be understood that according to some embodiments of the inventive concepts, there will be a plurality of Central Receiving Elements that may be used in order to perform all the above-described processing vis-à-vis all the co-channel/co-frequency signals. For example, if there is a plurality of N co-channel/co-frequency signals, N≥2, that are all deemed "desired" and must, therefore, be isolated/extracted and/or demodulated in order to provide information content, then N Central Receiving Elements may be required (it is at the Central Receiving Element that at least some cancellation/reduction of interference takes place). It will also be understood that not all Central Receiving Elements (of a plurality of Central Receiving Elements) need be of the same type. For example, some may be based on optical (e.g., infrared, ultraviolet) detection of energy whereas others may be based on detection of energy at radio frequencies.

It will also be apparent to those skilled in the art, that such coefficients as α, β, α', β', etc. may be determined/estimated via a plurality of known techniques including using pilot symbols; and that according to some embodiments of the inventive concepts, bi-directional communications (wireless and/or otherwise) may be provided between at least two Central Receiving Elements of a plurality of Central Receiving Elements, between a Central Receiving Element and a Receiver/Transmitter (such as the First and/or Second Receiver/Transmitter) and/or between at least two Receivers/Transmitters of a plurality of Receivers/Transmitters, such as the First and Second Receiver/transmitter illustrated in FIG. 1. Even though wireless communications (i.e., wireless transfer of information) is illustrated in FIG. 1 between the First Receiver/Transmitter and the Central Receiving Element and between the Second Receiver/Transmitter and the Central Receiving Element, in some embodiments the First and/or Second Receiver/Transmitter may be connected to the Central Receiving Element (and/or therebetween) via means other than wireless means (e.g., via wire/copper/metal cable, fiber optical cable, etc.) in lieu of wireless means or in addition to wireless means.

Those skilled in the art will also appreciate that even though the systems/methods of reducing (e.g., cancelling) interference, as described above, may be viewed as systems/methods that may be applied to a return link (e.g., from a mobile device to a base station), the systems/methods described herein are also applicable to a forward link (e.g., from the base station to the mobile device). Those skilled in the art will appreciate the utility of increasing a number of Receiving Elements and/or Transmitting Elements associated with any wireless communications technology, such as, for example, a radio frequency technology; for it may be said that as a number of Receiving/Transmitting elements being utilized by a system/method increases, one or more performance indices of the system/method, including capacity and quality-of-service, improve(s)/increase(s). Accordingly, it is envisaged that at some point in the future even walls of buildings may be equipped with Receiving/Transmitting elements embedded therein and networked/connected with other elements in an overall system/method (e.g., along the lines of neuron-networking) in order to increase capacity and optimize quality-of-service. It is also envisaged that as mobile devices proliferate further and a density thereof increases further, interconnection therebetween for the purpose of aiding one another will be implemented and, such interconnection may be transparent to end-users. For example, a first mobile device that is proximate to one or more other devices may be configured to establish communications links therebetween. Accordingly, if, for example, the first mobile device desires to send data to a base station, the first mobile device may be configured to distribute the data to the one or more other devices (that may be one or more other mobile devices) so that all devices (the first mobile device and the one or more other devices) can jointly relay the data to the base station, in accordance, for example, with principles described in the cited application Ser. No. 13/767,537 filed on Feb. 14, 2013 by the present inventor, entitled Systems/Methods of Carrier Aggregation Providing Increased Capacity Communications; and specifically, in accordance with FIG. 17 of the referenced application Ser. No. 13/767,537. Those skilled in the art will recognize that N antenna elements of N respective mobile devices may isomorphically replace the N antenna elements of FIG. 17 of application Ser. No. 13/767,537.

The Peripheral Contour that is illustrated in FIG. 1 comprises a contour on which a plurality of Receivers/Transmitters may be located. The Peripheral Contour may be at a distance from the Central Receiving Element; wherein a first distance from a first point on the Peripheral Contour to the Central Receiving Element may differ from a second distance that is associated with a second point on the Peripheral Contour to the Central Receiving Element. Furthermore, a distance from a device (desired or interfering) to a location on the Peripheral Contour at which a Receiver/Transmitter is located (such as the First Receiver/Transmitter or the Second Receiver/Transmitter) may be greater than, less than or the same as, a distance between the device and the Central Receiving Element. Some embodiments of the inventive concepts may comprise a plurality of contours (not illustrated in FIG. 1), as may be necessary, in order to accommodate a plurality of Receivers/Transmitters that may be, according to some embodiments, a large plurality of Receivers/Transmitters that a single contour may not be able to accommodate.

A channel response from a Receiver/Transmitter that is located on a Peripheral Contour to a Central Receiving Element may be determined by transmitting a pilot signal from said Receiver/Transmitter to said Central Receiving Element and by processing said pilot signal that is received at said Central Receiving Element. Transmitting a first pilot signal from a first Receiver/Transmitter to a specific Central Receiving Element and transmitting a second pilot signal from a second Receiver/Transmitter to the specific Central Receiving Element may be time-staggered therebetween according to some embodiments.

In embodiments of the inventive concepts relating to 4G LTE (and/or LTE-Advanced) that use Orthogonal Frequency Division Multiplexing ("OFDM"), Orthogonal Frequency Division Multiple Access ("OFDMA") and/or Single Carrier Frequency Division Multiple Access ("SC-FDMA"), first and second mobile devices that are concurrently and co-frequency being served by a sector of a base station may be configured to alternate therebetween in using a set of pilot subcarriers. Accordingly, alternating by the first and second mobile devices in using the set of pilot subcarriers may allow a Receiver on the Peripheral Contour of FIG. 1 (such as the First Receiver of the First Receiver/Transmitter element "1" on the Peripheral Contour and/or the Second Receiver of the Second Receiver/Transmitter element "2" on the Peripheral Contour) to determine channel responses $\alpha$ and $\alpha'$ from the first mobile device to Receiver/Transmitter elements "1" and "2," respectively, and then to determine channel responses $\beta$ and $\beta'$ from the second mobile device to Receiver/Transmitter elements "1" and "2," respectively.

A Receiver, such as the First and/or Second Receiver/Transmitter of FIG. 1, may be configured to perform a Fourier transform (such as, for example, a Discrete Fourier Transform ("DFT") or a Fast Fourier Transform ("FFT")) on a signal that is received by the Receiver in order to estimate a channel response (amplitude and/or phase) associated with one or more pilot signals of the received signal. Responsive to the estimated channel response, a phase and/or amplitude of the received signal may be altered and then, the received signal may be transmitted by a Transmitter, such as the First and/or Second Receiver/Transmitter of FIG. 1, towards the Central Receiving Element. In some embodiments, the phase and/or amplitude of the received signal may be altered in a frequency dependent manner (and/or bin dependent manner) responsive to a frequency dependent channel response. As an example, FIG. 1 illustrates a first signal being received by the First Receiver of the First Receiver/Transmitter element "1" and that the first signal is being transmitted towards the Central Receiving Element, by the First Transmitter of the First Receiver/Transmitter element "1," devoid of a channel related amplitude and/or phase alteration. In contrast, a second signal that is being received by the Second Receiver of the Second Receiver/Transmitter element "2" is being transmitted towards the Central Receiving Element, by the Second Transmitter of the Second Receiver/Transmitter element "2," following a channel related amplitude and/or phase alteration ($-\beta/\beta'$). It will be understood that any phase and/or amplitude adjustment(s) that may be necessary and relate to propagation from the First and/or Second Receiver/Transmitter element ("1" and/or "2") to the Central Receiving Element of FIG. 1 is/are not illustrated in FIG. 1.

Foreus Communications

Additional embodiments of the inventive concepts that will now be described relate to systems/methods that provide forward- and/or return-link wireless communications that, in lieu of (or in combination with) intentionally radiating an electromagnetic wave in order to convey information, convey information using "something else." That something else that is used to convey information will be called herein "foreus." Accordingly, foreus-based wireless communications may, for example, be based upon launching a modulated gravitational wave (if such a "thing" could be engineered) and/or launching a modulated ultra-sound wave. However, foreus-based wireless communications may also be based upon a modulated particle-based wave or stream/beam, such as, for example, a neutrino wave or neutrino stream/beam.

Figure 2:
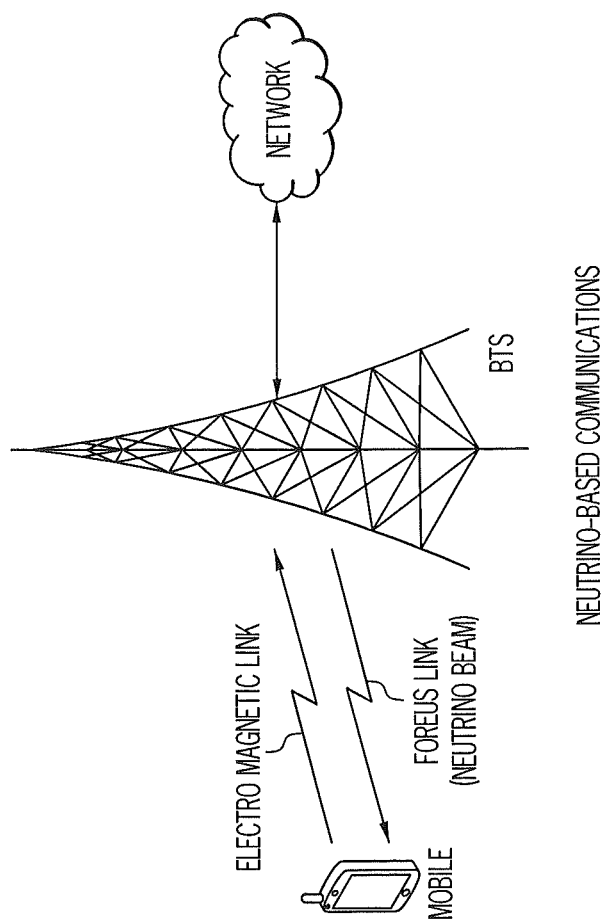
FIG. 2 is a schematic illustration of neutrino-based communications according to further embodiments of the present inventive concepts.

Referring to FIG. 2, a base station (or a Base Transceiver System), labelled as "BTS" in FIG. 2, is configured to convey information to a mobile device by using a foreus link that comprises a modulated neutrino beam. Any modulation method, such as, for example, pulse position, pulse amplitude and/or pulse code may be used to modulate the foreus link (e.g., the neutrino beam). The neutrino beam that is illustrated in FIG. 2 may be a directional neutrino beam that is launched by the BTS in a direction of the mobile device, responsive to the BTS being cognizant of a position of the mobile device (as may, for example, be relayed to the BTS by the mobile device). Accordingly, the BTS may comprise a foreus link generating apparatus (e.g., a neutrino generating apparatus, a neutrino modulator and/or a directional (or non-directional) neutrino beam launcher).

Still referring to FIG. 2, first and second neutrino beams (not illustrated) may be launched by the BTS to communicate information to respective first and second mobile devices that may be proximate therebetween. Accordingly, code discrimination may be used between the first and second neutrino beams and/or time division multiplexing may be used therebetween as described, for example, in U.S. patent application Ser. No. 13/767,537, filed Feb. 14, 2013, entitled Systems/Methods of Carrier Aggregation Providing Increased Capacity Communications, corresponding to U.S. Patent Application Publication 2013/0170569, which is hereby incorporated herein by reference in its entirety as if set forth fully herein.

Currently, and in the foreseeable future, a neutrino beam detector may not be practical for integration with a mobile device due to, for example, weight, size and/or cost constraints that may be associated therewith. Similarly, a neutrino generator, a neutrino modulator and/or a neutrino beam launcher may also be impractical for integration with the mobile device. Accordingly, as is illustrated in FIG. 2, an electromagnetic link may be established between the mobile device and the BTS so that the mobile device may use a modulated electromagnetic wave to convey information to the BTS thus avoiding a need to integrate therein a neutrino generator, a neutrino modulator and/or a neutrino beam launcher. Furthermore, in order to relieve the mobile device from needing a neutrino detector, the neutrino detector may be integrated with a structure other than the mobile device (such as a building or vehicle), and/or may be provided as a stand-alone entity, and an Electro-Magnetic Link ("EML"), that may be a short-range EML, may be established between the neutrino detector and the mobile device in order to convey information therebetween.

Figure 3:
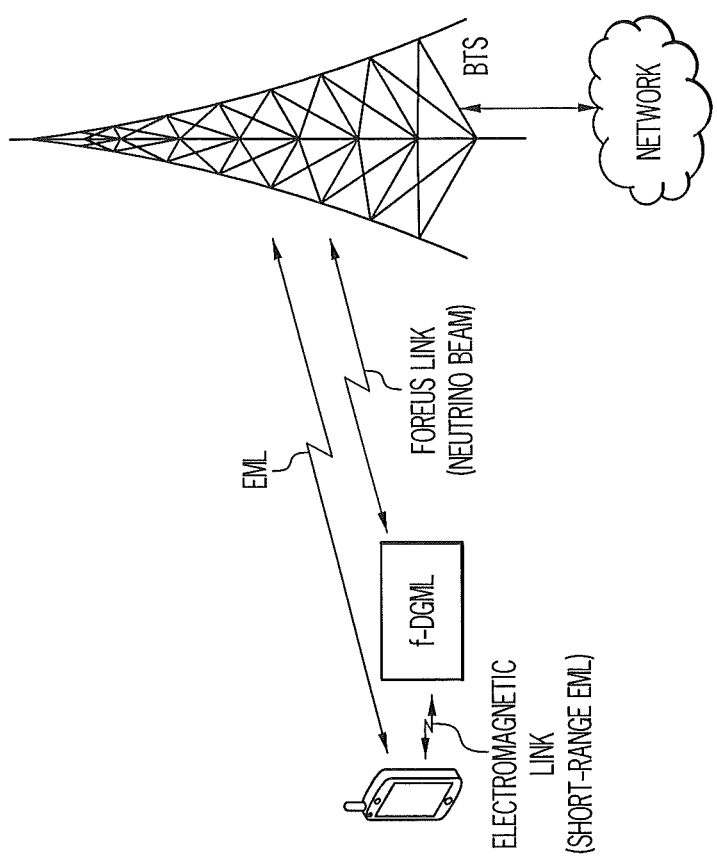
FIG. 3 is a schematic illustration of neutrino-based communications according to additional embodiments of the present inventive concepts.

FIG. 3 illustrates embodiments of inventive concepts wherein a foreus Detector, Generator, Modulator and/or Launcher ("f-DGML") is configured to serve as an intermediary between a BTS and a mobile device; wherein the BTS also includes a f-DGML and wherein the mobile device is devoid of a f-DGML. In some embodiments the f-DGML comprises a neutrino Detector, Generator, Modulator and/or Launcher ("n-DGML"). It will be understood that according to some embodiments of the inventive concepts, the BTS includes an ability to communicate with a first mobile device directly, without using the f-DGML, by using one or more electromagnetic links conventionally (for the forward and/or return links thereof), and also includes an ability to communicate with a second and/or the first mobile device per the teachings of FIG. 2 and/or FIG. 3. Combinations and/or sub-combinations of such embodiments and/or any other embodiment described herein and/or in any of the documents that are incorporated herein by reference in their entirety as if fully set forth herein are also possible for the BTS, mobile device and/or f-DGML, as will be appreciated by those skilled in the art.

It would be unduly repetitious and obfuscating to describe and/or illustrate every combination and sub-combination of these embodiments. Accordingly, the present specification, including the drawing(s), Claims thereof and any and all cited applications that are assigned to the present Assignee, EICES Research, Inc., and are incorporated herein by reference in their entirety as if fully set forth herein, including any and all applications cited therein and incorporated therein by reference in their entirety as if set forth fully therein (including but not limited to any and all U.S. provisional applications associated therewith), shall be construed to constitute a complete written description of all combinations and sub-combinations of the embodiments described herein, and of the manner and process of making and using them, and shall support Claims to any such combination and/or subcombination.

As may be appreciated by those skilled in the art, a Multiple Input Multiple Output ("MIMO") technology relies upon a presence of multipath propagation in a channel to provide an increase in capacity and that, absent the multipath propagation in the channel the MIMO technology fails to provide the increase in capacity. In sharp contrast to the MIMO-based approach, systems/methods that are based upon embodiments of the present inventive concepts, as illustrated in FIG. 1, for example, and the description thereof in the present application, provide a capacity increase without relying upon the channel's multipath propagation characteristic. Accordingly, embodiments of the present inventive concepts can provide an additional flexibility that may be used as stand-alone or incorporated into a MIMO system/method in order to extend an operation/reliability thereof. Embodiments of the inventive concepts comprising an integration of systems/methods described herein with systems/methods of MIMO may be configured to estimate a channel condition and, responsive to the estimated channel condition, rely upon MIMO processing, rely upon processing as illustrated in FIG. 1 and described above, or rely upon a combination of MIMO processing and processing along the lines illustrated herein by FIG. 1 and the accompanying description thereof. For further discussion regarding transitioning between a first and second processing algorithm/methodology see, for example, paragraphs [00208] to of U.S. application Ser. No. 13/767,537, filed by the present inventor on Feb. 14, 2013 entitled Systems/Methods of Carrier Aggregation Providing Increased Capacity Communications (corresponding to U.S. Publication No. 2013/0170569), the entirety of which is incorporated herein by reference.

Specific exemplary embodiments of the inventive concepts have been described with reference to the accompanying drawings. These inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. It will be understood that any two or more embodiments of the present inventive concepts as presented herein may be combined in whole or in part to form one or more additional embodiments.

It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the inventive concepts. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although terms such as first, second, desired and interference are used herein to describe various elements and/or signals, these elements/signals should not be limited by these terms. These terms are only used to distinguish one element/signal from another element/signal. Thus, a first element/signal could be termed a second element/signal, and a second element/signal may be termed a first element/signal without departing from the teachings of the present inventive concepts. Similarly, a desired element/signal could be termed an interference element/signal, and an interference element/signal may be termed a desired element/signal without departing from the teachings of the present inventive concepts, as will be appreciated by those skilled in the art.

As used herein, the term "and/or" includes any and all combinations of one or more of the associated listed items. The symbol "/" is also used as a shorthand notation for "and/or".

As used herein, the term "transmitter" and/or "receiver" include(s) transmitters/receivers of cellular and/or satellite terminals with or without a multi-line display; smartphones and/or Personal Communications System (PCS) terminals that may include data processing, facsimile and/or data communications capabilities; Personal Digital Assistants (PDA) that can include a radio frequency transceiver and/or a pager, Internet/Intranet access, Web browser, organizer, calendar and/or a Global Positioning System (GPS) receiver;

and/or conventional laptop and/or palmtop computers or other appliances, which include a radio frequency transmitter and/or receiver. As used herein, the term "transmitter" and/or "receiver" also include(s) any other radiating device, equipment and/or source that may have time-varying and/or fixed geographic coordinates and/or may be portable, transportable, installed in a vehicle (aeronautical, maritime, or land-based) and/or situated/configured to operate locally and/or in a distributed fashion at any location(s) on earth, vehicles (land-mobile, maritime and/or aeronautical) and/or in space. A transmitter and/or receiver also may be referred to herein as a "base station," "access point," "device," "mobile device," "terminal," "smartphone" or as a "radio-terminal".

The present inventive concepts have been described with reference to figure(s), block diagram(s) and/or flowchart illustration(s) of methods, apparatus (systems) and/or computer program products according to embodiments of the inventive concepts. It is understood that a block of the block diagram(s) and/or flowchart illustration(s), and combinations of blocks in the block diagram(s) and/or flowchart illustration(s), can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the figure(s), block diagram(s) and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the figure(s), block diagram(s) and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the figure(s), block diagram(s) and/or flowchart block or blocks.

Accordingly, the present inventive concepts may be embodied in hardware and/or in software (including firmware, resident software, micro-code, etc.). Furthermore, the present inventive concepts may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

It should also be noted that in some alternate implementations, the functions/acts noted in the blocks of the block diagram(s)/flowchart(s) and/or figure(s) may occur out of the order noted in the block diagram(s)/flowchart(s) and/or figure(s). For example, two blocks shown in succession may in fact be executed substantially concurrently or the blocks may sometimes be executed in the reverse order, depending upon the functionality/acts involved. Moreover, the functionality of a given block of the flowchart(s)/block diagram(s) and/or figure(s) may be separated into multiple blocks and/or the functionality of two or more blocks of the flowchart(s)/block diagram(s) and/or figure(s) may be at least partially integrated therebetween.

Many different embodiments, besides those described herein, are possible in connection with the above description, drawing(s) and document(s) that have been incorporated herein, by reference, as will be appreciated by those skilled in the art. Any of the embodiments that are described herein may be combined with any of the principles/teachings/embodiments (in whole or in part) of U.S. patent application Ser. No. 13/753,700, filed Jan. 30, 2013, entitled Systems and/or Methods of Data Acquisition from a Transceiver; U.S. patent application Ser. No. 13/746,629, filed Jan. 22, 2013, entitled Systems/Methods of Preferentially Using a First Asset, Refraining from Using a Second Asset and Providing Reduced Levels of Interference to GPS and/or Satellites; and/or U.S. patent application Ser. No. 13/767,537, filed Feb. 14, 2013, entitled Systems/Methods of Carrier Aggregation Providing Increased Capacity Communications, all of which are incorporated herein by reference in their entirety as if set forth fully herein, including any and all U.S. provisional applications and/or other non-provisional applications cited therein and incorporated therein by reference in their entirety as if fully set forth therein and are assigned to the present Assignee, EICES Research, Inc.

It will be understood that it would be unduly repetitious and obfuscating to describe/illustrate every combination and sub-combination of these embodiments. Accordingly, the present specification, including the drawing(s), Claims and cited application(s) that are assigned to the present Assignee, EICES Research, Inc., and are incorporated herein by reference in their entirety as if fully set forth herein, shall be construed to constitute a complete written description of all combinations and sub-combinations of the embodiments described herein, and of the manner and process of making and using them, and shall support Claims to any such combination and/or subcombination.

In the drawings and specification, there have been disclosed embodiments of the inventive concepts and, although specific terms are employed, they are used in a generic and descriptive sense only and not for purposes of limitation, the scope of the inventive concepts being set forth in the following claims.

That which is claimed is:

1. A communications method comprising:
receiving by a first wireless receiver a first electromagnetic signal that comprises a combination of a desired component that is related to a desired signal and an interference component that is related to an interference signal, wherein each one of the desired signal and the interference signal are transmitted using a common set of frequencies by respective first and second physically distinct sources;
frequency shifting said first electromagnetic signal that is received by said first wireless receiver from frequencies at which the first electromagnetic signal is received at the first wireless receiver to frequencies that are mutually exclusive to said frequencies at which the first electromagnetic signal is received at the first wireless receiver;
providing said first electromagnetic signal that is received by said first wireless receiver and is frequency shifted to a first wireless transmitter;

transmitting by said first wireless transmitter said first electromagnetic signal that is frequency shifted;

receiving by a second wireless receiver a second electromagnetic signal that comprises a combination of a desired component that is related to said desired signal and an interference component that is related to said interference signal;

frequency shifting said second electromagnetic signal that is received by said second wireless receiver from frequencies at which the second electromagnetic signal is received at the second wireless receiver to frequencies that are mutually exclusive to said frequencies at which the second electromagnetic signal is received at the second wireless receiver;

processing the second electromagnetic signal that is received by the second wireless receiver and is frequency shifted;

providing said second electromagnetic signal that is received by said second wireless receiver following said frequency shifting and processing thereof to a second wireless transmitter;

transmitting by the second wireless transmitter the second electromagnetic signal that has been frequency shifted and processed; and concurrently wirelessly receiving at a receiving element the first electromagnetic signal that has been frequency shifted and transmitted by said first wireless transmitter and the second electromagnetic signal that has been frequency shifted and processed and transmitted by said second wireless transmitter so that respective components thereof that are related to the interference signal at least partially cancel one another upon reception at the receiving element at the frequencies of reception by the receiving element;

wherein said processing the second electromagnetic signal that is received by the second wireless receiver comprises altering a phase thereof.

2. The communications method according to claim 1, wherein said processing the second electromagnetic signal that is received by the second receiver further comprises:

transforming using a Fourier transformation and inverse transforming using an inverse Fourier transformation.

3. The communications method according to claim 1, wherein said frequency shifting comprises:

frequency shifting from a cellular band of frequencies to a band of frequencies outside of the cellular band of frequencies.

4. The communications method according to claim 1, further comprising:

receiving at each one of the first and second wireless receivers first and second measures of respective first and second desired signals, that are generated by respective first and second desired sources that are physically distinct and independent of one another; the first and second desired sources using respective first and second mutually exclusive frequencies to generate the first and second desired signals, respectively;

receiving, at each one of the first and second wireless receivers first and second measures of respective first and second interference signals, that are generated by respective first and second interference sources that are physically distinct and independent of one another, concurrently with said receiving the first and second desired signals; the first and second interference sources using the first and second mutually exclusive frequencies to generate the first and second interference signals, respectively; and commanding the second interference source to use the first frequencies in generating the second interference signal responsive to a phase measurement.

5. The method of claim 1, wherein the first and second electromagnetic signals are transmitted so that the respective components thereof that are related to the interference signal at least partially destructively add together upon reception at the receiving element.

6. The method of claim 1, wherein the first and second electromagnetic signals are transmitted so that the respective components thereof that are related to the interference signal destructively add together upon reception at the receiving element to a greater extent than an extent, if any, to which the respective components thereof that are related to the desired signal destructively add together upon reception at the receiving element.

7. A communications system configured to perform operations comprising:

receiving by a first wireless receiver a first electromagnetic signal that comprises a combination of a desired component that is related to a desired signal and an interference component that is related to an interference signal; wherein each one of the desired signal and the interference signal are transmitted using a common set of frequencies by respective first and second physically distinct sources;

frequency shifting said first electromagnetic signal that is received by said first wireless receiver from frequencies at which the first electromagnetic signal is received at the first wireless receiver to frequencies that are mutually exclusive to said frequencies at which the first electromagnetic signal is received at the first wireless receiver;

providing said first electromagnetic signal that is received by said first wireless receiver and is frequency shifted to a first wireless transmitter;

transmitting by said first wireless transmitter said first electromagnetic signal that is frequency shifted;

receiving by a second wireless receiver a second electromagnetic signal that comprises a combination of a desired component that is related to said desired signal and an interference component that is related to said interference signal;

frequency shifting said second electromagnetic signal that is received by said second wireless receiver from frequencies at which the second electromagnetic signal is received at the second wireless receiver to frequencies that are mutually exclusive to said frequencies at which the second electromagnetic signal is received at the second wireless receiver;

processing the second electromagnetic signal that is received by the second wireless receiver and is frequency shifted;

providing said second electromagnetic signal that is received by said second wireless receiver and is frequency shifted and processed to a second wireless transmitter;

transmitting by the second wireless transmitter the second electromagnetic signal that has been frequency shifted and processed; and concurrently wirelessly receiving at a receiving element the first electromagnetic signal that has been frequency shifted and transmitted by said first wireless transmitter and the second electromagnetic signal that has been frequency shifted and processed and transmitted by said second wireless transmitter so that respective components thereof that are related to the interference signal at least partially cancel one another upon reception at the receiving element at the frequencies of reception by the receiving element;

wherein said processing the second electromagnetic signal that is received by the second wireless receiver comprises altering a phase thereof.

8. The communications system according to claim 7, wherein said processing the second electromagnetic signal that is received by the second wireless receiver further comprises altering an amplitude thereof.

9. The communications system according to claim 7, wherein said frequency shifting comprises frequency shifting from a cellular band of frequencies to a band of frequencies outside of the cellular band of frequencies.

10. The communications system according to claim 9, wherein said band of frequencies outside of the cellular band of frequencies comprises one or more of: optical frequencies, infrared frequencies and ultraviolet frequencies.

11. The communications system according to claim 7, wherein said operations further comprise:

receiving at each one of the first and second wireless receivers first and second measures of respective first and second desired signals, that are generated by respective first and second desired sources that are physically distinct and independent of one another; the first and second desired sources using respective first and second mutually exclusive frequencies to generate the first and second desired signals, respectively;

receiving, at each one of the first and second wireless receivers first and second measures of respective first and second interference signals, that are generated by respective first and second interference sources that are physically distinct and independent of one another, concurrently with said receiving the first and second desired signals; the first and second interference sources using the first and second mutually exclusive frequencies to generate the first and second interference signals, respectively; and commanding the second interference source to use the first frequencies in generating the second interference signal responsive to a phase measurement.

* * * * *